April 1, 1952     G. E. W. DRECHSEL     2,591,241
SKID CHAIN
Filed April 27, 1949
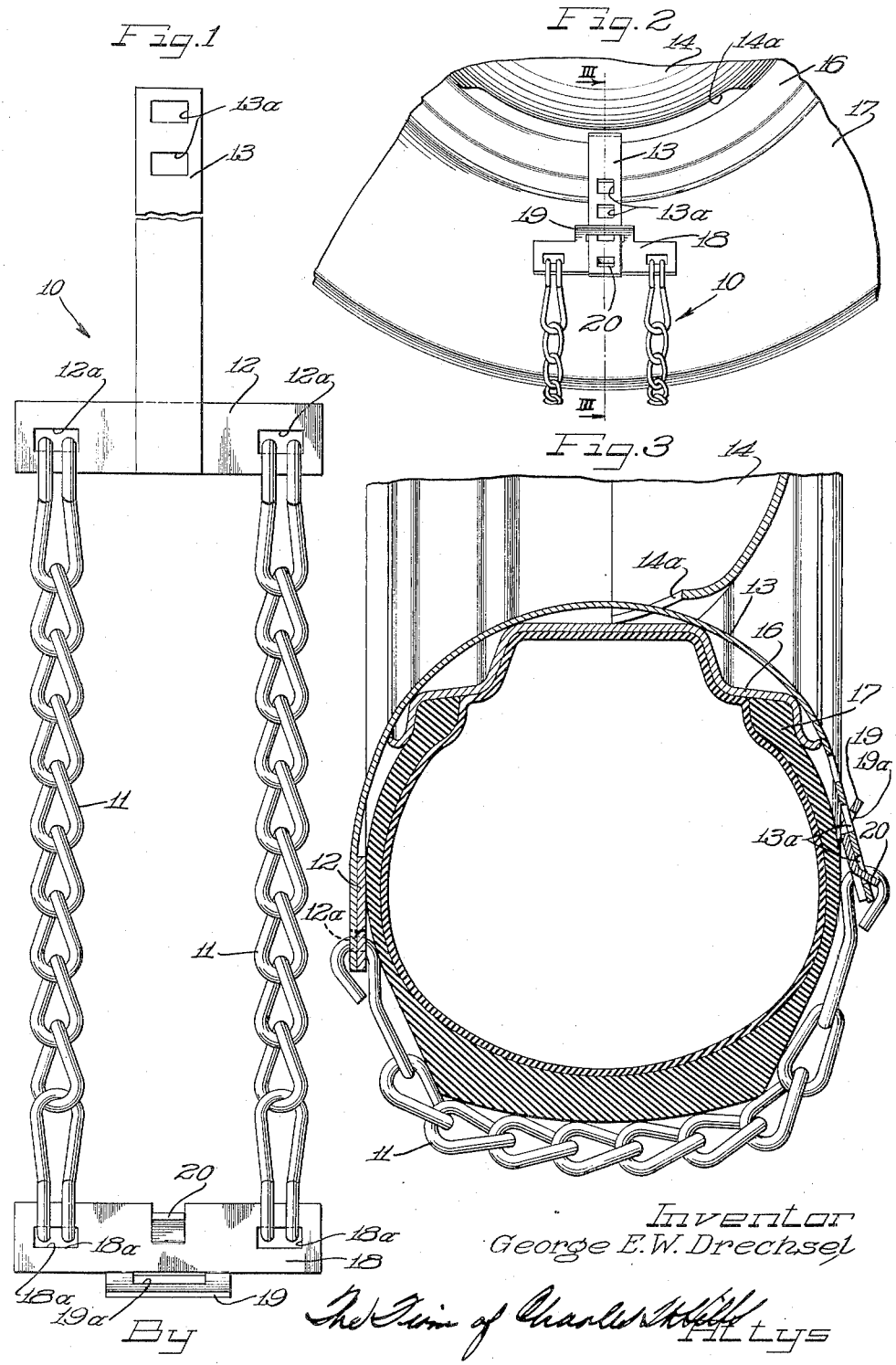
Inventor
George E. W. Drechsel Patented Apr. 1, 1952

2,591,241

UNITED STATES PATENT OFFICE 2,591,241

SKID CHAIN

George E. W. Drechsel, Chicago, Ill.

Application April 27, 1949, Serial No. 89,900

2 Claims. (Cl. 152—237)

This invention relates generally to emergency traction or anti-skid devices and more particularly to a skid chain structure which may be applied on the wheel of a vehicle such as an automobile or the like equipped with pneumatic tires.

According to the general features of the present invention, a detachable skid chain structure may be provided for a vehicle wheel which includes a pair of chain elements having tie bars connected at the ends thereof. A rim encompassing strap is secured to one of the tie bars and is preferably constructed to define a plurality of spaced slotted apertures near its free end. The tie bar on the opposite end of the chain elements preferably takes the form of an integral piece of metal having its upper margin outwardly offset and perforated to freely pass the free end of the strap and a portion of its lower margin bent out to define an angularly disposed locking lug.

To employ my skid chain structure, the chain elements are positioned for road gripping contact and the strap is passed through an appropriate aperture in the vehicle wheel. The free end of the strap is then passed through the apertured margin of the tie bar and the locking lug is selectively seated in one of the spaced strap apertures.

Thus, my skid chain structure may be adjustably integrated with any conventional vehicle wheel, for example, those equipped with pneumatic tires.

It is an object of this invention to provide a simple and inexpensive skid chain structure which is easy to manufacture and completely efficient for its intended purpose.

A further object of this invention is to provide a skid chain structure which may be adjustably applied to or with a vehicle wheel and positively locked thereto.

Another object of my invention is to provide a skid chain structure which may be easily and conveniently connected to a vehicle wheel.

Many other features, advantages and objects of the present invention will become manifest to those versed in the art upon making reference to the detailed description which follows and the accompanying sheet of drawings, in which:

Figure 1 is a laid out plan view of a skid chain structure according to the present invention;

Figure 2 is a side elevational view of a broken segment of a typical automobile wheel having the skid chain structure shown in Figure 1 made integral therewith; and Figure 3 is an enlarged fragmentary cross-sectional view taken on line III—III of Figure 2.

As shown on the drawings:

A skid chain structure is indicated generally by the reference numeral 10 and comprises a plurality of spaced road-engaging elements or anti-skid elements such as a pair of chains 11. One end of the chains 11 is connected to a tie bar 12 suitably apertured as at 12a so as to maintain the chains 11 in parallel spaced relationship.

A strap 13 is connected to the tie bar 12. In the present embodiment, the strap 13 preferably takes the form of a flexible metal element which may be firmly connected to the tie bar 12 by means of spot welding or similar fastening procedure. It may be noted, however, that the strap 13 could conceivably be made of other material such as a braided wire or strengthened fabrics and the like.

In any event, the strap 13 is constructed to pass through the apertures provided in a vehicle wheel so as to encompass the rim portions of the wheel. This will be made evident upon making reference to Figure 2 where a wheel 14 is shown provided with a suitable wheel aperture 14a spaced adjacent a wheel rim 16 having mounted thereon a pneumatic tire 17. As will be noted, the strap 13 passes through the aperture 14a. The free end of the strap 13 is provided with a plurality of spaced slotted apertures 13a, the utility of which will be explained presently.

On the other end of the chains 11 is connected a locking bar or tie bar 18. The bar 18 is provided with a pair of spaced apertures 18a for receiving the ends of the chains 11 in parallel spaced relationship. As will be clearly seen on the drawings, the bar 18 is further provided with an upturned or offset margin or flange 19 on one edge which is suitably perforated as at 19a and through which the free end of the strap 13 may be freely passed. The opposite edge of the bar 18 is characterized by an outwardly bent portion along the margin of the bar 18 defining a lug 20.

As will be readily apparent upon making reference to Figure 3, the flange 19 and the lug 20 are relatively spaced and are angularly disposed in such a manner as to define intersecting planes.

To employ my skid chain structure for use in connection with a vehicle wheel, the chains 11 are placed in road engaging position on the pneumatic tire 17. The strap 13 is extended over the inner side of the wheel rim 16 and passes through the wheel aperture 14a. The free end of the strap 13 is then passed through the aperture 19a of the flange 19 to complete an encircling loop with the chains 11. The skid chain structure 10 may be tightly drawn up with the wheel 14 to any desired degree of tightness after which one of the spaced apertures 13a of the strap 13 is engaged over the lug 20 projecting outwardly from the bar 18.

It will be apparent that in the event my skid chain structure is employed with a small-tired wheel, any surplus end portion of the strap 13 may be cut off so that the strap 13 will be of approximately the right length for quick attachment and detachment with the particular vehicle wheel.

It will be apparent to those versed in the art that I have described a skid chain structure which may be easily and conveniently attached and detached to a vehicle wheel. It will be further apparent that I have described a skid chain structure which is economical to manufacture and which may be formed from durable and simple components arranged in a novel manner to be efficiently locked to a vehicle wheel.

It will be understood, of course, that various modifications may be suggested to those versed in the art in connection with the preferred embodiment herein shown and described by way of illustrated example and, accordingly, I do not wish to be expressly limited except as required by the scope of my contribution to the art.

I claim as my invention:

1. An emergency traction device for a vehicle wheel comprising, a plurality of spaced road engaging elements, a tie bar directly secured on each end of said elements, a strap formed in a loop configuration to encompass a portion of the vehicle wheel attached to one of said tie bars, said strap defining a plurality of spaced slots near its free end, the other of said tie bars having an outwardly turned flange defining an opening to receive the free end of said strap in confining relationship, said other of said tie bars also having an outwardly turned lug spaced from said flange selectively received in one of said spaced slots in said strap, thereby to form a locked-together closed loop.

2. A traction device for a vehicle wheel comprising a pair of anti-skid elements, means connected directly to one end of said elements to define a strap portion for encompassing said vehicle wheel, said strap portion defining a plurality of spaced apertures near the free end thereof, and a locking bar directly connected on the other end of said anti-skid elements, said locking bar having one margin offset outwardly and having an opening therethrough to receive the free end of said strap, said locking bar having a portion of its opposite margin bent outwardly to define a lug selectively engaging one of the apertures in said strap, whereby said device may be adjustably integrated with said vehicle wheel.

GEORGE E. W. DRECHSEL.

REFERENCES CITED

The following references are of record in the file of this patent:

UNITED STATES PATENTS

| Number | Name | Date |
|---|---|---|
| 2,069,979 | Stahl | Feb. 9, 1937 |
| 2,315,060 | Kane | Mar. 30, 1943 |
| 2,420,804 | Wenzel | May 20, 1947 |
| 2,453,426 | Freed | Nov. 9, 1948 |